United States Patent
Zhang et al.

(10) Patent No.: US 8,649,347 B2
(45) Date of Patent: Feb. 11, 2014

(54) METHOD AND DEVICE FOR SETTING DEMODULATION REFERENCE SIGNALS IN WIRELESS COMMUNICATION SYSTEM

(75) Inventors: Zhi Zhang, Beijing (CN); Ming Xu, Beijing (CN); Masayuki Hoshino, Kanagawa (JP); Seigo Nakao, Kanagawa (JP); Daichi Imamura, Kanagawa (JP)

(73) Assignee: Panasonic Corporation, Osaka (JP)

( * ) Notice: Subject to any disclaimer, the term of this patent is extended or adjusted under 35 U.S.C. 154(b) by 161 days.

(21) Appl. No.: 13/378,134

(22) PCT Filed: Apr. 9, 2010

(86) PCT No.: PCT/CN2010/071666
§ 371 (c)(1),
(2), (4) Date: Dec. 14, 2011

(87) PCT Pub. No.: WO2010/145275
PCT Pub. Date: Dec. 23, 2010

(65) Prior Publication Data
US 2012/0093124 A1    Apr. 19, 2012

(30) Foreign Application Priority Data
Jun. 19, 2009   (CN) .......................... 2009 1 0149933

(51) Int. Cl.
*H04W 4/00*         (2009.01)
(52) U.S. Cl.
USPC ............ 370/329; 370/341; 370/343; 370/345
(58) Field of Classification Search
USPC ......... 370/286, 330, 338, 344, 348, 329, 341, 370/343, 345; 375/260, 267
See application file for complete search history.

(56) References Cited

U.S. PATENT DOCUMENTS

| 6,539,063 | B1 * | 3/2003 | Peyla et al. ................... 375/267 |
| 7,940,740 | B2 * | 5/2011 | Krishnamurthy et al. .... 370/344 |

(Continued)

FOREIGN PATENT DOCUMENTS

| CN | 101373999 A | 2/2009 |
| CN | 101409583 A | 4/2009 |
| CN | 101416410 A | 4/2009 |
| CN | 101453438 A | 6/2009 |

OTHER PUBLICATIONS

3GPP TSG-RAN WG1 #57, May 4-8, 2009, "Downlink RS structure in support of higher-order MIMO", San Francisco, USA, R1-092050.

(Continued)

*Primary Examiner* — Brian D Nguyen
*Assistant Examiner* — Toan Nguyen
(74) *Attorney, Agent, or Firm* — Pearne & Gordon LLP

(57) ABSTRACT

Demodulation reference signals and data are transmitted to a receiving terminal through time/frequency resources of the radio communication system using a resource block as a base unit. The method includes arranging at least two orthogonal DM-RSs in two edge OFDM symbols for resource blocks of respective cells, a frequency offset existing between cells at positions of the orthogonal DM-RSs in the edge OFDM symbols, performing puncturing at positions corresponding to the orthogonal DM-RSs of the other cells in the edge OFDM symbols of the respective cells, arranging superimposing DM-RSs in the two edge OFDM symbols in a resource block of one cell and arranging the superimposing DM-RSs at positions corresponding to the resource blocks of the other cells, wherein positions of the superimposing DM-RSs are set between the positions of the orthogonal DM-RSs in the respective edge OFDM symbols.

14 Claims, 9 Drawing Sheets

(56) References Cited

U.S. PATENT DOCUMENTS

| | | | |
|---|---|---|---|
| 8,238,303 B2* | 8/2012 | Zangi et al. | 370/330 |
| 2004/0208138 A1* | 10/2004 | Hayashi et al. | 370/286 |
| 2009/0202010 A1* | 8/2009 | Fu et al. | 375/260 |
| 2009/0296925 A1 | 12/2009 | Kishiyama et al. | |
| 2010/0254341 A1 | 10/2010 | Sun et al. | |

OTHER PUBLICATIONS

International Search Report for PCT/CN2010/071666 dated Jul. 15, 2010.

* cited by examiner

METHOD AND DEVICE FOR SETTING DEMODULATION REFERENCE SIGNALS IN WIRELESS COMMUNICATION SYSTEM

TECHNICAL FIELD

The present invention relates to a communication field, and more particularly, to an arrangement of demodulation reference signals in a radio communication system.

BACKGROUND ART

In multiantenna radio communication systems based on OFDM (Orthogonal Frequency Division Multiplexing) in recent years, for example, LTE-A (Long Term Evolution-Advanced) under design, several downlink multi-base-station coordinated techniques including non-coherent downlink joint transmission (non-coherent joint transmission) and coordinated beamforming require mutually orthogonal demodulation reference signals (DM-RS) among coordinated cells. FIG. 1 shows an illustrative system framework of non-coherent downlink joint transmission and coordinated beamforming. As shown in FIG. 1, in non-coherent downlink joint transmission, different data streams are transmitted from base stations of cell 1 and cell 2 to a terminal (UE) in a coordinated manner. The terminal (UE) receives different data streams from base stations of different cells on the same time and frequency resources. Although these data streams are superimposed on the time and frequency, since the data streams originate from different base stations, they can be said to have passed through different channels or have different spatial characteristics. The terminal needs to classify the data streams using different spatial characteristics of the data streams. The terminal can measure the spatial characteristics of the data streams using reference signals inserted beforehand in predetermined time and space resources. If reference signals of different data streams are also superimposed on each other on the time and frequency, the terminal cannot measure spatial characteristics of the data streams based on these reference signals. Therefore, the terminal (UE) requires reference signals orthogonal to each other between cells so that they are used to detect different data streams from cell 1 and cell 2. In coordinated beamforming, base stations of cell 1 and cell 2 form specific beams to their respective terminals UE_A and UE_B through precoding. However, terminal UE_A and UE_B also receive interference from the base station of the neighboring cell. Therefore, terminal UE_A and UE_B need reference signals orthogonal to each other between the cells to improve accuracy of channel estimation with respect to the cells.

In the LTE-A system under discussion, a base station of each cell transmits different pieces of data to terminals using resource blocks (RB) of the same time/frequency resources. FIG. 2 shows one resource block in the LTE-A system. A resource block is made up of resource elements (REs). The horizontal axis direction in FIG. 2 shows time and the vertical axis direction shows frequency, and one column in the vertical axis direction represents one OFDM symbol and DM-RSs are arranged beforehand in several resource elements in the resource block. The terminal performs interpolation using DM-RSs in the resource block, estimates channel conditions on other REs in the resource block and further performs demodulation. In the LTE-A, DM-RSs and data in the resource block are precoded for a specific terminal. In other words, precoding used for different terminals may not be the same. Even for the same terminal, channel conditions on different resource blocks differ from each other, and therefore precoding may not be identical. Since the terminal can only perform channel estimation using a resource block using the same precoding scheme, the terminal can actually only estimate a condition of a channel occupied by the resource block using DM-RSs inside the one resource block. That is, it is not possible to estimate a channel condition inside the resource block using DM-RSs of other than one resource block. In this case, to use an interpolation algorithm more effectively, it is necessary to arrange DM-RSs on an OFDM symbol (symbol) as close as possible to an edge of the resource block and improve the accuracy of interpolation. FIG. 2 illustrates the situation in which DM-RSs are arranged following this policy. As shown in FIG. 2, the first three columns of the resource block are a reserved control region and cannot be used for an arrangement of DM-RSs. For this reason, DM-RSs are arranged on two edge OFDM symbols in the data region (that is, portion other than the control region) of the resource block.

In view of the above-described situation, when arranging DM-RSs in a resource block, it is preferable to arrange DM-RSs at edges of the resource block as much as possible and at the same time maintain orthogonality of DM-RSs between the cells. One arrangement scheme that can be easily thought of in this regard is shown in FIG. 3. As shown in FIG. 3, the density of DM-RSs in a resource block of each cell is 12 DM-RSs per resource block. Six DM-RSs are arranged in each of two edge OFDM symbols of a data block for resource blocks of cell 1 and cell 2. In order for DM-RSs of cell 1 and cell 2 to be orthogonal to each other, an offset exists in DM-RSs of cell 2 with respect to DM-RSs of cell 1 on the frequency and data puncturing is performed at positions corresponding to the DM-RSs of cell 2 in the resource block of cell 1, and vice versa.

SUMMARY OF INVENTION

Technical Problem

However, when three neighboring cells exist, a problem emerges if the arrangement scheme as shown in FIG. 3 is employed. To be more specific, when three neighboring cells 1 to 3 exist, DM-RSs need to be arranged by occupying six resource elements in edge OFDM symbols for resource blocks of the respective cells according to the arrangement scheme as shown in FIG. 3 first. After that, puncturing needs to be performed at positions corresponding to DM-RSs of the other two cells in the edge OFDM symbols. That is, data puncturing needs to be performed by occupying 12 resource elements. However, since the edge OFDM symbols include nothing more than 12 resource elements, it is obvious that the above-described arrangement cannot be realized. In other words, it is not possible to arrange all DM-RSs of the three cells at edges of the data region of the resource block and at the same time realize orthogonality between the cells.

FIG. 4 shows a kind of arrangement scheme that can realize orthogonality of DM-RSs among three cells. As shown in FIG. 4, four DM-RSs are arranged on each of three OFDM symbols including two edge OFDM symbols in the resource blocks of the respective cells and puncturing is performed at positions corresponding to DM-RSs of the other two cells in the OFDM symbols, and orthogonality among the cells is thereby realized. Such a scheme can realize orthogonality of DM-RSs among the three cells, but arrangement or puncturing of DM-RSs needs to be performed by occupying 36 resource elements in the respective resource blocks (that is, these 36 resource elements cannot be used to transmit data), causing system overhead to increase excessively.

Therefore, how to arrange all DM-RSs in the three cells at positions as close as possible to edges of the resource blocks and at the same time realize orthogonality among the cells and maintain relatively small system overhead constitutes the problem to be solved for the present field.

Solution To Problem

One aspect of the present application provides a method of arranging demodulation reference signals in a radio communication system that communicates according to a coordinated scheme, the demodulation reference signals and data being transmitted to a receiving terminal through time/frequency resources of the radio communication system using a resource block as a base unit, the method including a step of arranging at least two orthogonal demodulation reference signals in two edge orthogonal frequency division multiplexing symbols located on one side of a time domain and the other side of the time domain respectively in data regions of resource blocks of respective cells, a frequency offset existing between cells at positions of the orthogonal demodulation reference signals in the edge orthogonal frequency division multiplexing symbols, and performing puncturing at positions corresponding to the orthogonal demodulation reference signals of the other cells in the edge orthogonal frequency division multiplexing symbols of the respective cells and a step of arranging superimposing demodulation reference signals in the two edge orthogonal frequency division multiplexing symbols in a resource block of one cell and puncturing at positions corresponding to the orthogonal demodulation reference signals of the other cells in the edge orthogonal frequency division multiplexing symbols of the respective cells, wherein positions of the superimposing demodulation reference signals are set between the positions of the orthogonal demodulation reference signals in the respective edge orthogonal frequency division multiplexing symbols.

Another aspect of the present application provides a method of arranging demodulation reference signals in a radio communication system that communicates according to a coordinated scheme, the demodulation reference signals and data being transmitted to a receiving terminal through time/frequency resources of the radio, communication system using a resource block as a base unit, the method including a step of arranging a first orthogonal demodulation reference signal at a high-frequency end of one edge orthogonal frequency division multiplexing symbol of data regions of resource blocks of respective cells, arranging a second orthogonal demodulation reference signal at a low-frequency end of the other edge orthogonal frequency division multiplexing symbol, a frequency offset existing between cells at positions of the first orthogonal demodulation reference signal and the second orthogonal demodulation reference signal in the edge orthogonal frequency division multiplexing symbol, and performing puncturing at positions corresponding to the first orthogonal demodulation reference signal and the second orthogonal demodulation reference signal of the other cells in the edge orthogonal frequency division multiplexing symbol, a step of arranging a third orthogonal demodulation reference signal at a low-frequency end of the one edge orthogonal frequency division multiplexing symbol for resource blocks of the respective cells, arranging a fourth orthogonal demodulation reference signal at a high-frequency end of the other edge orthogonal frequency division multiplexing symbol, a frequency offset existing between cells at positions of the edge orthogonal frequency division multiplexing symbols of the third orthogonal demodulation reference signal and the fourth orthogonal demodulation reference signal, and performing puncturing at positions in the other cells corresponding to the third orthogonal demodulation reference signal and the fourth orthogonal demodulation reference signal in the edge orthogonal frequency division multiplexing symbol and a step of arranging superimposing demodulation reference signals in the one edge orthogonal frequency division multiplexing symbol and the other edge orthogonal frequency division multiplexing symbol of the resource block of one cell and arranging the superimposing demodulation reference signals at the corresponding positions of the resource blocks of the other cells.

A further aspect of the present application provides an apparatus that arranges demodulation reference signals in a radio communication system that communicates according to a coordinated scheme, the demodulation reference signals and data being transmitted to a receiving terminal through time/frequency resources of the radio communication system using a resource block as a base unit, the apparatus including an orthogonal demodulation reference signal arrangement section that arranges at least two orthogonal demodulation reference signals in two edge orthogonal frequency division multiplexing symbols of a data region for resource blocks of the respective cells, a frequency offset existing between cells at positions of the orthogonal demodulation reference signals in the edge orthogonal frequency division multiplexing symbols and performs puncturing at positions corresponding to the orthogonal demodulation reference signals of the other cells in the edge orthogonal frequency division multiplexing symbols and a superimposing demodulation reference signal arrangement section that arranges superimposing demodulation reference signals in the two edge orthogonal frequency division multiplexing symbols in a resource block of one cell in which the orthogonal demodulation reference signals are arranged and arranges the superimposing demodulation reference signals at corresponding positions in the resource blocks of the other cells, wherein the position of the superimposing demodulation reference signal is set between the positions of the orthogonal demodulation reference signals in the respective edge orthogonal frequency division multiplexing symbols.

A still further aspect of the present application provides an apparatus that arranges demodulation reference signals in a radio communication system that communicates according to a coordinated scheme, the demodulation reference signals and data being transmitted to a receiving terminal through time/frequency resources of the radio communication system using a resource block as a base unit, the apparatus including a first orthogonal demodulation reference signal arrangement section that arranges a first orthogonal demodulation reference signal at a high-frequency end in one edge orthogonal frequency division multiplexing symbol of data regions in resource blocks of respective cells, arranges a second orthogonal demodulation reference signal at a low-frequency end of the other edge orthogonal frequency division multiplexing symbol, a frequency offset existing between cells at positions of the first orthogonal demodulation reference signal and the second orthogonal demodulation reference signal in the edge orthogonal frequency division multiplexing symbol and performs puncturing at positions corresponding to the first orthogonal demodulation reference signal and the second orthogonal demodulation reference signal of the other cells in the edge orthogonal frequency division multiplexing symbol, a second orthogonal demodulation reference signal arrangement section that arranges a third orthogonal demodulation reference signal at a low-frequency end of the one edge orthogonal frequency division multiplexing symbol and a fourth orthogonal demodulation reference signal at a high-frequency end of the other edge orthogonal frequency division multiplexing symbol in resource blocks of respective cells in which the first orthogonal demodulation reference signal and the second orthogonal demodulation reference signal are arranged, a frequency offset existing between cells at positions of the third orthogonal demodulation reference signal and the fourth orthogonal demodulation reference signal in the edge orthogonal frequency division multiplexing symbols, and performs puncturing at positions corresponding to the third orthogonal demodulation reference signal and the fourth orthogonal demodulation reference signal of the other cells in the edge orthogonal frequency division multiplexing symbols and a superimposing demodulation reference signal arrangement section that arranges a superimposing demodulation reference signal in the one edge orthogonal frequency division multiplexing symbol and the other edge orthogonal frequency division multiplexing symbol in a resource block of one cell in which the orthogonal demodulation reference signals are arranged and arranges the superimposing demodulation reference signals at corresponding positions in the resource blocks of the other cells.

Advantageous Effects of Invention

Using the method and apparatus for arranging reference signals provided by the present invention makes it possible to arrange, when there are three cells, all DM-RSs of each cell as close as possible to edges of a resource block and at the same time realize orthogonality among cells of DM-RSs and maintain relatively small system overhead.

BRIEF DESCRIPTION OF DRAWINGS

From the following detailed descriptions combining drawings and embodiments of the present invention, these embodiments and/or other embodiments and advantages of the present invention will be made clearer and more understandable, where.

DESCRIPTION OF EMBODIMENTS

Figure 1:
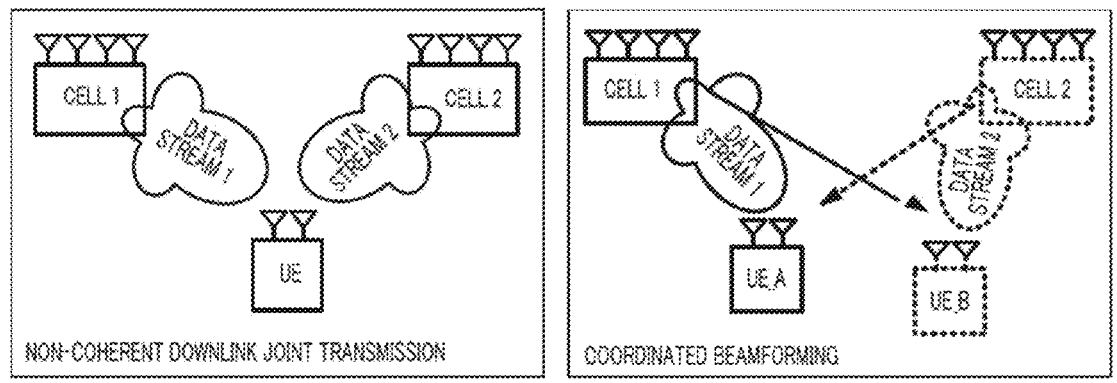
FIG. 1 is a diagram illustrating a framework of an illustrative system of non-coherent downlink joint transmission and coordinated beamforming.
Figure 2:
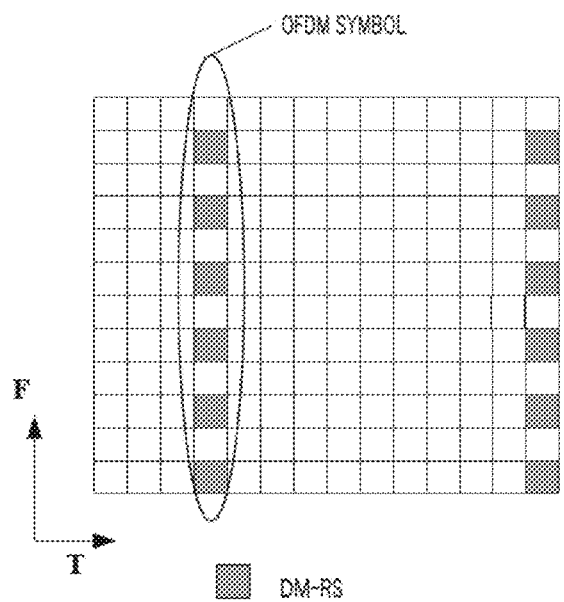
FIG. 2 is a schematic diagram showing DM-RSs arranged at edges of a resource block.

Hereinafter, specific embodiments of the present invention will be described in detail by combining the accompanying drawings. Considering detailed descriptions for several related arts might make the gist of the present invention ambiguous, hence detailed descriptions thereof will not be presented here. In respective embodiments, elements or means for executing the same function will be shown using the same reference numerals assigned thereto.

(Embodiment 1)

Figure 5:
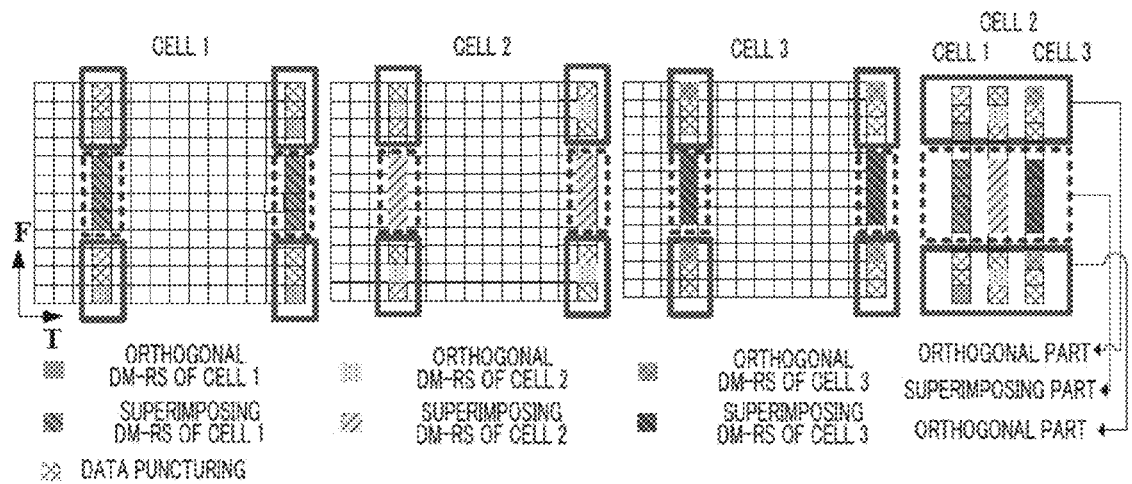
FIG. 5 shows a situation in which DM-RSs are arranged in resource blocks of three neighboring cells using a DM-RS arrangement method according to Embodiment 1 of the present invention.

FIG. 5 shows a situation in which DM-RSs are arranged in resource blocks of three neighboring cells using a DM-RS arrangement method according to Embodiment 1 of the present invention; As shown in FIG. 5, DM-RSs of the respective cells are made up of two parts; an orthogonal part (part in a frame of a solid line in the figure) and a superimposing part (part in a frame of a broken line in the figure). The DM-RSs of the orthogonal part realize orthogonality of DM-RSs among cells through a frequency offset among cells and puncturing of corresponding positions (hereinafter, DM-RS of the orthogonal part will be abbreviated as "orthogonal DM-RS"). The DM-RSs of the superimposing part are not involved in a frequency offset between cells and are arranged at the same positions in a resource block of each cell (hereinafter, the DM-RS in the superimposing part will be abbreviated as "superimposing DM-RS").

In FIG. 5, two orthogonal DM-RSs are arranged in two edge OFDM symbols of the data region in the resource block of each cell. Furthermore, at positions of edge OFDM symbols at which orthogonal DM-RSs are arranged, it is observable that there is a frequency offset between cells. In the resource block of cell 1, data transmission is punctured at positions corresponding to orthogonal DM-RSs of cells 2 and 3 and corresponding puncturing is also performed in the resource blocks of cell 2 and 3. Furthermore, in consideration of the accuracy of channel estimation, all orthogonal DM-RSs are arranged at positions as close as possible to the four corners of the data region of the resource block. In other words, each orthogonal DM-RS is arranged at the highest possible frequency and lowest possible frequency positions in edge OFDM symbols on the assumption that orthogonal DM-RSs are guaranteed to be orthogonal to each other between cells. On the other hand, four superimposing DM-RSs are arranged in each of the edge OFDM symbols of cells 1 to 3 and superimposing DM-RSs are located at the same positions in the resource block of each cell and it is observable that DM-RSs are superimposed on each other between cells.

Figure 3:
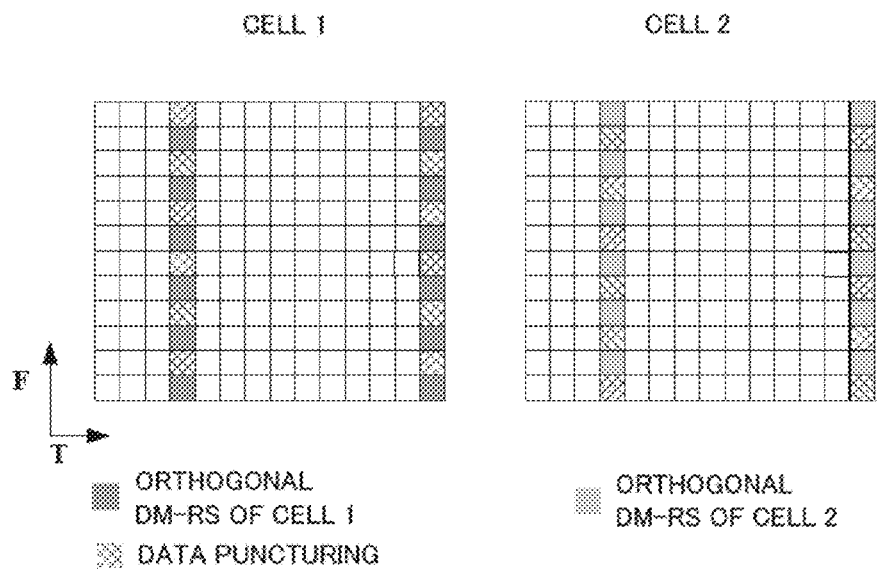
FIG. 3 is a schematic diagram showing DM-RSs arranged in resource blocks in a situation of two neighboring cells.
Figure 4:
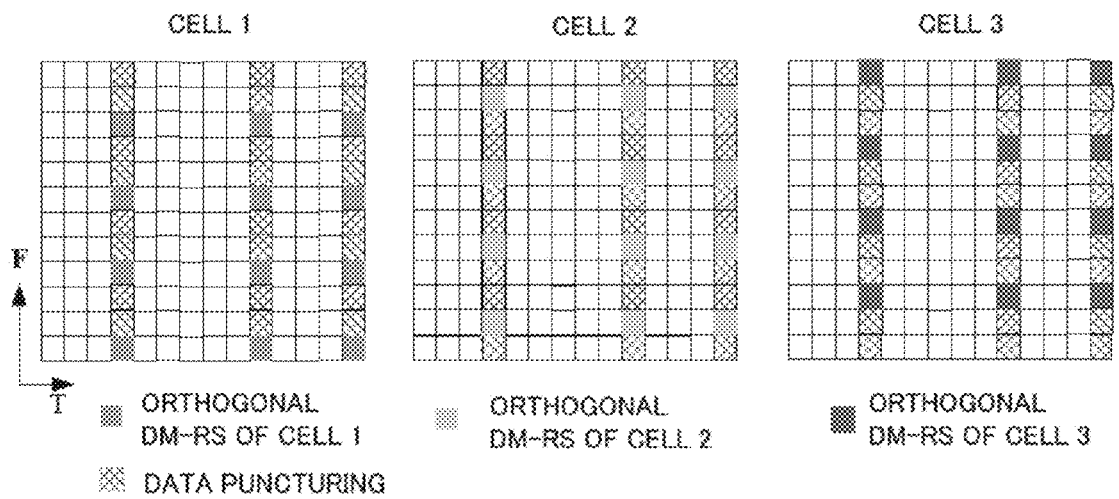
FIG. 4 is a schematic diagram showing DM-RSs arranged in resource blocks in a situation of three neighboring cells.

Unlike the arrangement methods shown in FIG. 3 and FIG. 4, DM-RS signals in the present embodiment are divided into orthogonal DM-RSs and superimposing DM-RSs. Since data puncturing need not be performed for superimposing DM-RSs, the amount of occupation of resource elements required for the arrangement of DM-RSs can be reduced. This allows all DM-RSs to be arranged in edge OFDM symbols and increases the degree of freedom of arrangement of DM-RSs on edge OFDM symbols. At the same time, orthogonal DM-RSs guarantee orthogonality among three cells.

Figure 6:
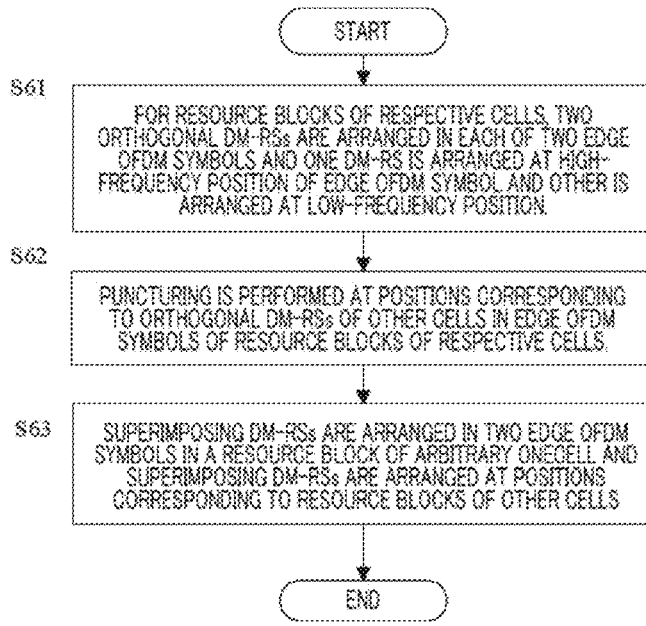
FIG. 6 is a flowchart of the DM-RS arrangement method according to Embodiment 1 of the present invention.

FIG. 6 is a flowchart of the DM-RS arrangement method according to Embodiment 1 of the present invention. In step S61, for the resource blocks of the respective cells, two orthogonal DM-RSs are arranged in each of two edge OFDM symbols of the data region and one of the above-described two orthogonal DM-RSs is arranged at the highest possible frequency position of the edge OFDM symbol and the other is arranged at the lowest possible frequency position. Furthermore, a frequency offset between cells exist at positions of orthogonal DM-RSs on the edge OFDM symbols here. In step S62, puncturing is performed at positions corresponding to the orthogonal DM-RSs of the other cells in the edge OFDM symbols of the resource blocks of the respective cells. In step S63, superimposing DM-RSs are arranged in two edge OFDM symbols in a resource block of an arbitrary one cell and superimposing DM-RSs are arranged at positions corresponding to resource blocks of the other cells.

What requires explanation is that orthogonal DM-RSs are arranged at the highest possible frequency and lowest possible frequency positions of an edge OFDM symbol in the present embodiment, but this is not essential. Actually, the present invention can be implemented if only it is guaranteed that a position in an OFDM symbol at which a superimposing DM-RS is placed is sandwiched between positions at which orthogonal DM-RSs are placed.

What deserves to be mentioned is that when data is transmitted to a receiving terminal using a resource block in which DM-RSs are arranged according to the method of the present embodiment, the receiving terminal acquires DM-RSs of each cell and can further estimate the channel state of each cell. To be more specific, since orthogonality between cells is maintained regarding orthogonal DM-RSs of each cell, the receiving terminal can directly acquire the orthogonal DM-RS of each cell from the resource block. Regarding superimposing DM-RSs, although the superimposing DM-RSs of each cell are superimposed at the same positions in the resource block on the receiving terminal side, those skilled in the art can separate the superimposing DM-RSs using a publicly known appropriate method. For example, a kind of preferable scheme can separate the superimposing DM-RSs using a method based on MMSE (minimum mean square error). The MMSE-based method can be roughly summarized in the following steps: 1. Regarding cells 2 and 3, superimposing DM-RSs of cells 2 and 3 are estimated through MMSE using their respective orthogonal DM-RSs as the amount of observation. 2. The superimposing DM-RSs of cell 1 are estimated by removing the superimposing DM-RSs of cells 2 and 3 obtained in step 1 from the total superimposing signal of the superimposing DM-RSs of the three cells. 3. The superimposing DM-RSs of cell 1 are refined through MMSE using the orthogonal DM-RSs of cell 1 and the superimposing DM-RSs estimated in step 2 as the amounts of observation. 4. The superimposing DM-RSs of cell 2 are estimated by removing the superimposing DM-RSs of cell 3 and the refined superimposing DM-RSs of cell 1 from the total superimposing signal of the superimposing DM-RSs of the three cells. 5. The superimposing DM-RSs of cell 2 are refined through MMSE using the orthogonal DM-RSs of cell 2 and superimposing DM-RSs of cell 2 estimated in step 4 as the amounts of observation. 6. The superimposing DM-RS signals of cell 3 are estimated by removing the refined superimposing DM-RSs of cell 1 and cell 2 from the total superimposing signal of the superimposing DM-RSs of the three cells. 7. The superimposing DM-RSs of cell 3 are refined through MMSE using the orthogonal DM-RSs of cell 3 and the superimposing DM-RSs of cell 3 estimated in step 6 as the amounts of observation. This makes it possible to obtain relatively accurate superimposing DM-RSs of each cell. The present method estimates superimposing DM-RSs of each cell through MMSE, but this is nothing more than one example. For example, it can be easily thought of that signals can be estimated using other arbitrary linear detection methods such as MLE (maximum likelihood detection) instead of MMSE.

(Embodiment 2)

Embodiment 2 is a modification of Embodiment 1. In Embodiment 2, although DM-RSs can also be divided into orthogonal DM-RSs and superimposing DM-RSs, all these DM-RSs are not arranged in two edge OFDM symbols of a data region of a resource block, but arranged in four OFDM symbols close to edges of the resource block.

Figure 7:
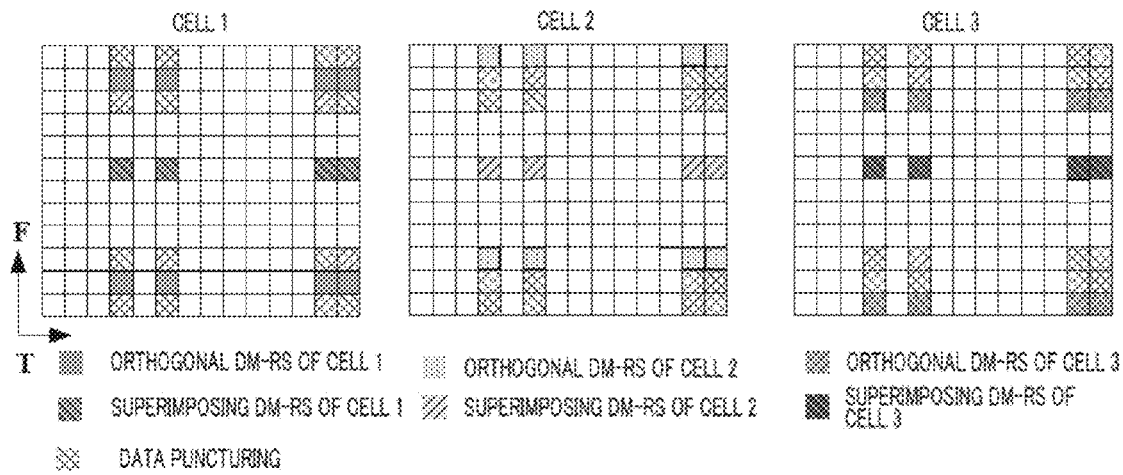
FIG. 7 shows a situation in which DM-RSs are arranged in resource blocks of three neighboring cells using a DM-RS arrangement method according to Embodiment 2 of the present invention.

FIG. 7 shows a situation in which DM-RSs are arranged in resource blocks of three neighboring cells using the DM-RS arrangement method according to Embodiment 2 of the present invention. As shown in FIG. 7, orthogonal DM-RSs and superimposing DM-RSs are arranged in two edge OFDM symbols of a data region in a resource block of each cell as in the case of FIG. 5. In addition, orthogonal DM-RSs and superimposing DM-RSs are arranged in available sub-edge OFDM symbols adjacent to these two edge OFDM symbols respectively (the fifth column in the resource block is a reserved region and not used to arrange DM-RSs, and so the sixth column and final column are two available sub-edge OFDM symbols).

Figure 8:
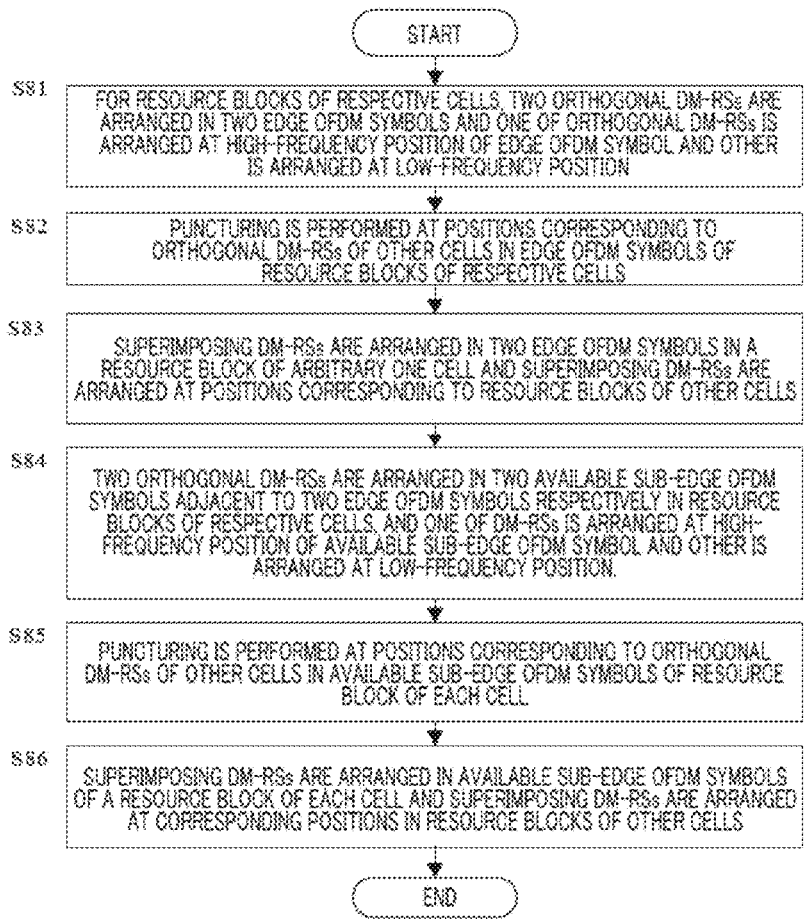
FIG. 8 is a flowchart of the DM-RS arrangement method according to Embodiment 2 of the present invention.

FIG. 8 is a flowchart of the DM-RS arrangement method according to Embodiment 2 of the present invention. As shown in FIG. 8, steps S81 to S83 describe operations of arranging orthogonal DM-RSs and superimposing DM-RSs in two edge OFDM symbols of each cell. Since the operations in steps S81 to S83 are similar to the operations in steps S61 to S63 in FIG. 6, descriptions thereof will be omitted here. After this, in steps S84 to S86, DM-RSs are arranged in available sub-edge OFDM symbols of the resource block of each cell. To be more specific, in step S84, two orthogonal DM-RSs are arranged in two available sub-edge OFDM symbols adjacent to two edge OFDM symbols respectively in the resource blocks of the respective cells, and one of the above-described two orthogonal DM-RSs is arranged at the highest possible frequency position of the available sub-edge OFDM symbol and the other is arranged at the lowest possible frequency position. Furthermore, a frequency offset between cells exists at positions of orthogonal DM-RSs in the available sub-edge OFDM symbols. In step S85, puncturing is performed at positions corresponding to orthogonal DM-RSs of other cells in available sub-edge OFDM symbols of the resource block of each cell, and in step S86, superimposing DM-RSs are arranged in two available sub-edge OFDM symbols of a resource block of an arbitrary one cell and superimposing DM-RSs are arranged at corresponding positions of the resource blocks of the other cells.

In the present embodiment as in the case of Embodiment 1, orthogonal DM-RSs are arranged at the highest possible frequency and lowest possible frequency positions of the edge OFDM symbols and available sub-edge OFDM symbols, but this is not essential. Actually, the present invention can be implemented if only it is guaranteed that the positions at which superimposing DM-RSs are arranged are sandwiched between the positions at which orthogonal DM-RSs are arranged in the respective edge OFDM symbols and available sub-edge OFDM Symbols.

(Embodiment 3)

A case has been described in Embodiments 1 and 2 where DM-RS signals are arranged in a situation in which one resource block only transmits: one-layer data. There is actually a possibility that two-layer data may be transmitted using one resource block. The present embodiment expands the resource block arrangement method in Embodiment 2 of the present invention as shown in FIG. 7 and thereby arranges DM-RSs for a resource block that transmits two-layer data.

In a situation in which two-layer data is transmitted using one resource block, data of the first layer and data of the second layer are different pieces of data, and so different precoding schemes are used. What is finally transmitted using a data block is a result of coding data of different layers using different precoding schemes and then further superimposing one layer on another. Furthermore, all data of respective layers have their corresponding DM-RSs, which are precoded using the same precoding scheme as that for the layered data. In the LTE-A system under discussion, it is already determined that DM-RSs corresponding to these two-layer data are for the resource blocks and are orthogonal to each other (use time and frequency resources not superimposing on each other). Orthogonality between two layers of DM-RSs can be realized using a scheme such as time division multiplexing (TDM) and code division multiplexing (CDM). The receiving terminal (UE) receives the superimposed two-layer data from the base station of the cell, then performs channel estimation using DM-RSs which are orthogonal between two layers and further demodulates the two-layer data.

Figure 9:
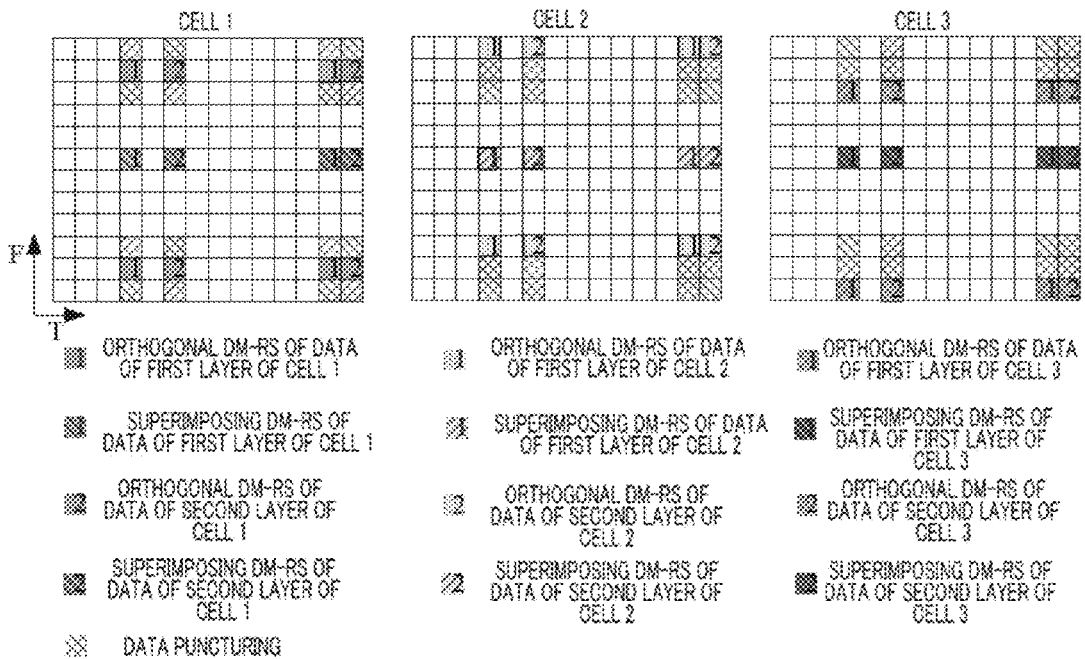
FIG. 9 shows a situation in which DM-RSs are arranged in resource blocks of three neighboring cells when orthogonality is realized between two layers of data of resource blocks using a time division multiplexing scheme.

FIG. 9 shows a situation in which DM-RSs are arranged in resource blocks of three neighboring cells when realizing orthogonality between two-layer data of the resource blocks using a time division multiplexing scheme. When FIG. 9 is compared with FIG. 7, it is observable that the arrangement scheme of DM-RSs including two-layer data in one resource block (FIG. 9) is substantially the same as the arrangement scheme of DM-RSs including one-layer data (FIG. 7). Hereinafter, for convenience of explanation, an edge OFDM symbol located on one side (e.g., left side) of the time axis of a resource block shown in FIG. 9 is called a "first edge OFDM symbol" and an edge OFDM symbol located on the other side (e.g., right side) on the time axis is called a "second edge OFDM symbol," and two available sub-edge OFDM symbols neighboring the first and second edge OFDM symbols respectively are called "first available sub-edge OFDM symbol" and "second available sub-edge OFDM symbol" respectively. As shown in FIG. 9, DM-RSs are arranged in the resource blocks according to the DM-RS arrangement method described in Embodiment 2 of the present invention. Here, orthogonal DM-RSs and superimposing DM-RSs arranged in the first edge OFDM symbol and second available sub-edge OFDM symbol of each cell in steps S81 to S86 are assumed to be orthogonal DM-RSs and superimposing DM-RSs used for the data of the first layer. Furthermore, orthogonal DM-RSs and superimposing DM-RSs arranged in the second edge OFDM symbol and first available sub-edge OFDM symbol of each cell are assumed to be orthogonal DM-RSs and superimposing DM-RSs to be used for the data of the second layer. Since the DM-RSs arranged for the data of the first layer and the DM-RSs arranged for the data of the second layer are different from each other on the time resource, orthogonality of the DM-RSs is maintained between the data of the first layer and the data of the second layer.

Figure 10:
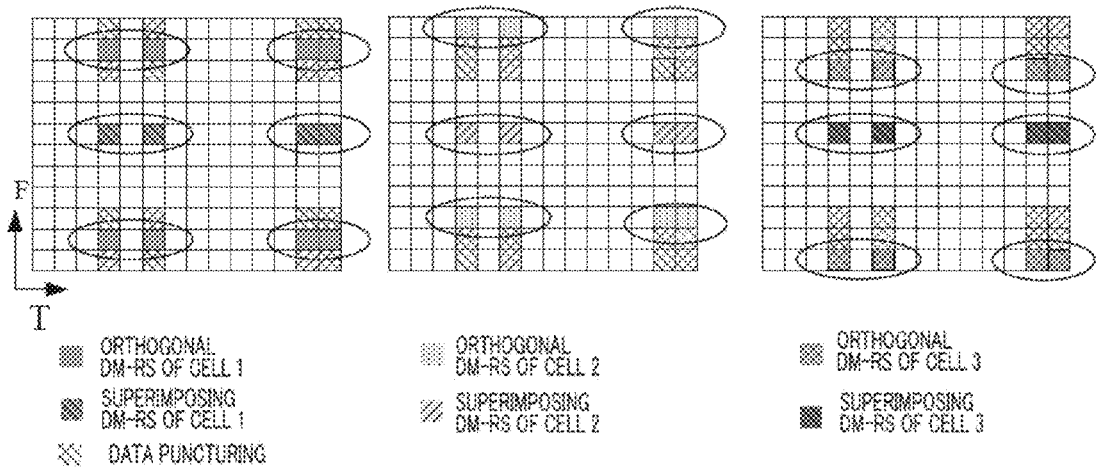
FIG. 10 shows a situation in which DM-RSs are arranged in resource blocks of three neighboring cells when orthogonality is realized between two layers of data of resource blocks using a code division multiplexing scheme.

FIG. 10 shows a situation in which DM-RSs are arranged in resource blocks of three neighboring cells when realizing orthogonality between DM-RSs of two-layer data of the resource blocks using a code division multiplexing scheme. Similarly, when FIG. 10 is compared with FIG. 7, it is observable that the DM-RS arrangement scheme including two-layer data in one resource block (FIG. 10) is substantially the same as the arrangement scheme of DM-RSs including one-layer data (FIG. 7). To be more specific, as shown in FIG. 10, orthogonal DM-RSs and superimposing DM-RSs are arranged according to the DM-RS arrangement method described in Embodiment 2 of the present invention for the data of the first layer and the data of the second layer respectively. Thus, orthogonal DM-RSs and superimposing DM-RSs used for the data of the first layer, and orthogonal DM-RSs and superimposing DM-RSs used for the data of the second layer are superimposing one on another at the same positions in the resource block. In this situation, orthogonality between two layers of DM-RSs is realized using a code division multiplexing scheme (e.g., by expanding DM-RSs of the data of the first layer and the data of the second layer using a Walsh code having a length of 2).

In FIG. 9 and FIG. 10, it is observable that the arrangement of DM-RSs for data of the respective layers satisfies the following basic thoughts of the present invention. DM-RS signals are divided into orthogonal DM-RS signals and superimposing DM-RS signals and orthogonality of orthogonal DM-RSs between cells is maintained through a frequency offset and puncturing. Furthermore, both orthogonal DM-RSs and superimposing DM-RSs are arranged at edges of the resource block whenever possible and orthogonal DM-RSs are located in the four corners of the resource block whenever possible.

The embodiment shown in FIG. 9 and FIG. 10 uses the respective resource blocks of the three cells for transmission of two-layer data, which is however not essential. It can be easily thought of that the three cells can transmit one-layer data or two-layer data in resource blocks as required. To be more specific, for example, resource blocks of one or two cells out of the three cells are used to transmit two-layer data and DM-RSs are arranged according to the scheme shown in FIG. 9 or FIG. 10 and at the same time, resource blocks of the other two or one cell out of the three cells are used to transmit one-layer data and DM-RSs are arranged according to the scheme in FIG. 7.

(Embodiment 4)

In the above-described three embodiments, four orthogonal DM-RSs are arranged for data of the respective layers using the DM-RS arrangement method corresponding to a situation in which two-layer data is included in one resource block and a situation in which one-layer data is included in one resource block, and these orthogonal DM-RSs are located in the four corners of the data region of each resource block. However, actually, this method is sometimes difficult to realize. For example, when a resource block includes data of a plurality of layers, a total of 12 DM-RSs are arranged in one data block, and therefore the number of orthogonal DM-RSs used for data of each layer may fall below 4. For this reason, the DM-RSs cannot be arranged in the four corners of the data region of the resource block either. Alternatively, in Embodiment 1, for example, since all DM-RSs are arranged on edge OFDM symbols, even in a situation in which one resource block includes two-layer data, it is difficult to arrange all orthogonal DM-RSs in the four corners of the data region of the resource block for data of the respective layers. Concerning this problem, Embodiment 4 of the present invention will be presented.

Figure 11:
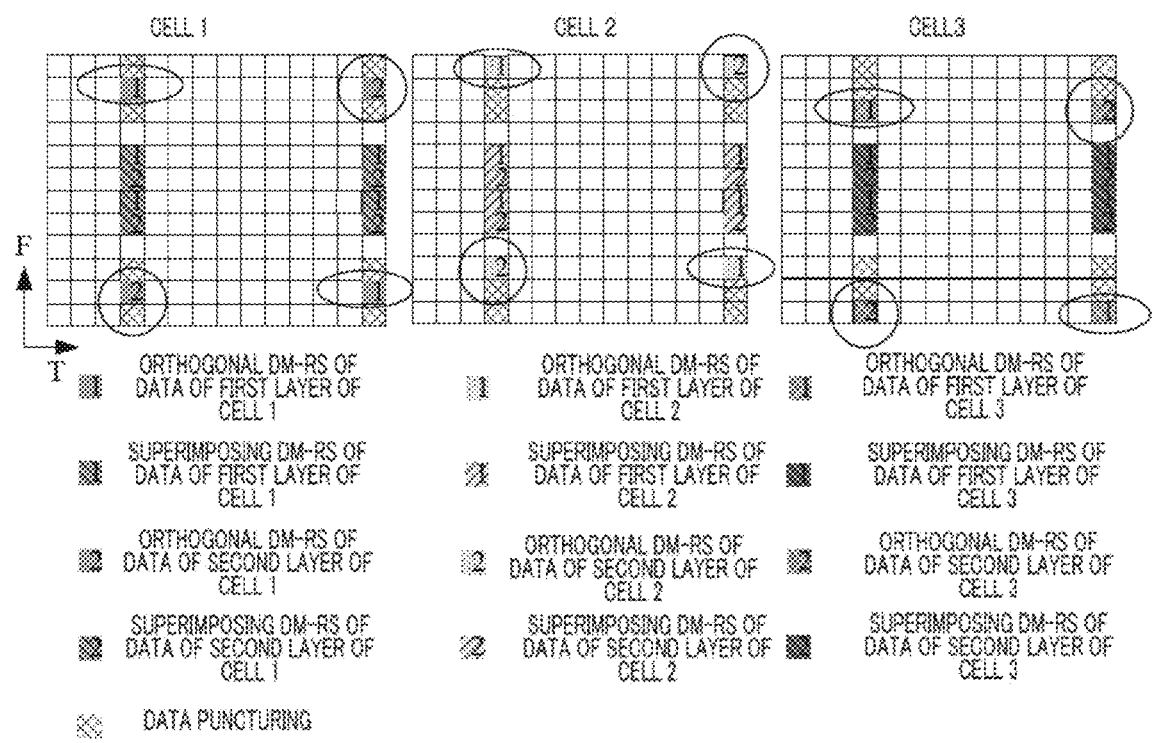
FIG. 11 shows a situation in which DM-RSs are arranged in resource blocks of three neighboring cells using a DM-RS arrangement method according to Embodiment 4 of the present invention.

FIG. 11 shows a situation in which DM-RSs are arranged in resource blocks of three neighboring cells using the DM-RS arrangement method according to Embodiment 4 of the present invention. Embodiment 4 is equivalent to Embodiment 1 shown in FIG. 1 expanded to a situation including two-layer data. From a comparison between FIG. 11 and FIG. 1, the following can be observed. The DM-RS arrangement scheme in a situation including two-layer data (FIG. 11) is basically the same as that in a situation including one-layer data (FIG. 1). The situation including two-layer data (FIG. 11) is different from the situation including one-layer data (FIG. 1) in that in the embodiment shown in FIG. 11, two orthogonal DM-RSs are arranged for data of the respective layers and the two orthogonal DM-RSs are located not in the four corners of the data region of the resource block but at positions on the two diagonals of the data region of the resource block. For example, as shown in FIG. 11, two orthogonal DM-RSs enclosed by a circle are used for the first layer of the data block of each cell and two orthogonal DM-RSs enclosed by an ellipse are used for the second layer.

Figure 12:
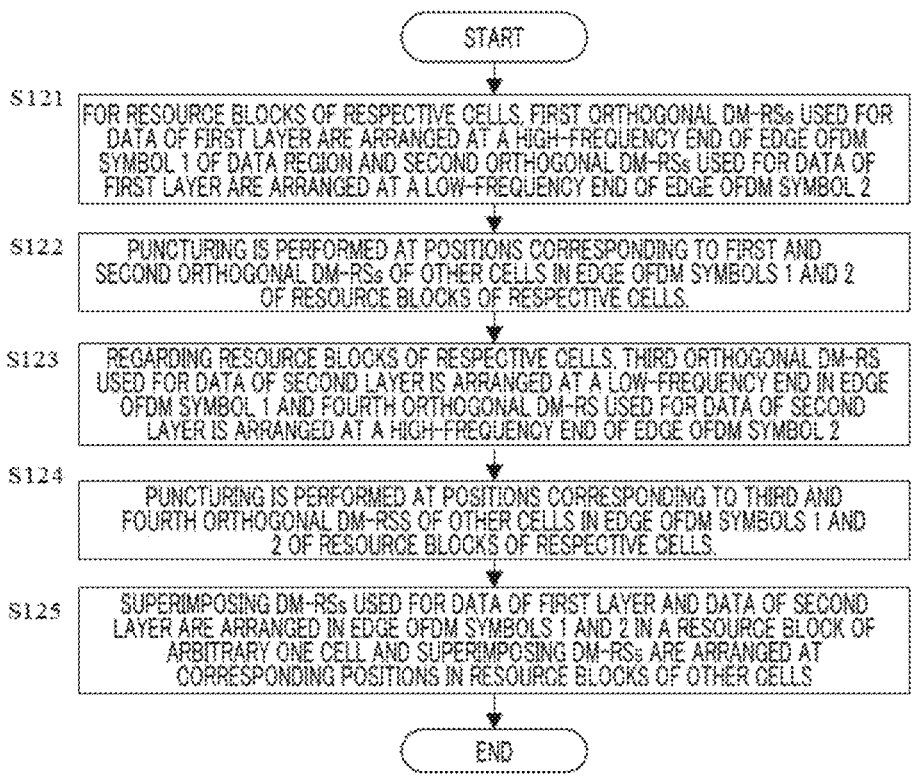
FIG. 12 is a flowchart of a DM-RS arrangement method according to Embodiment 4 of the present invention.
Figure 13:
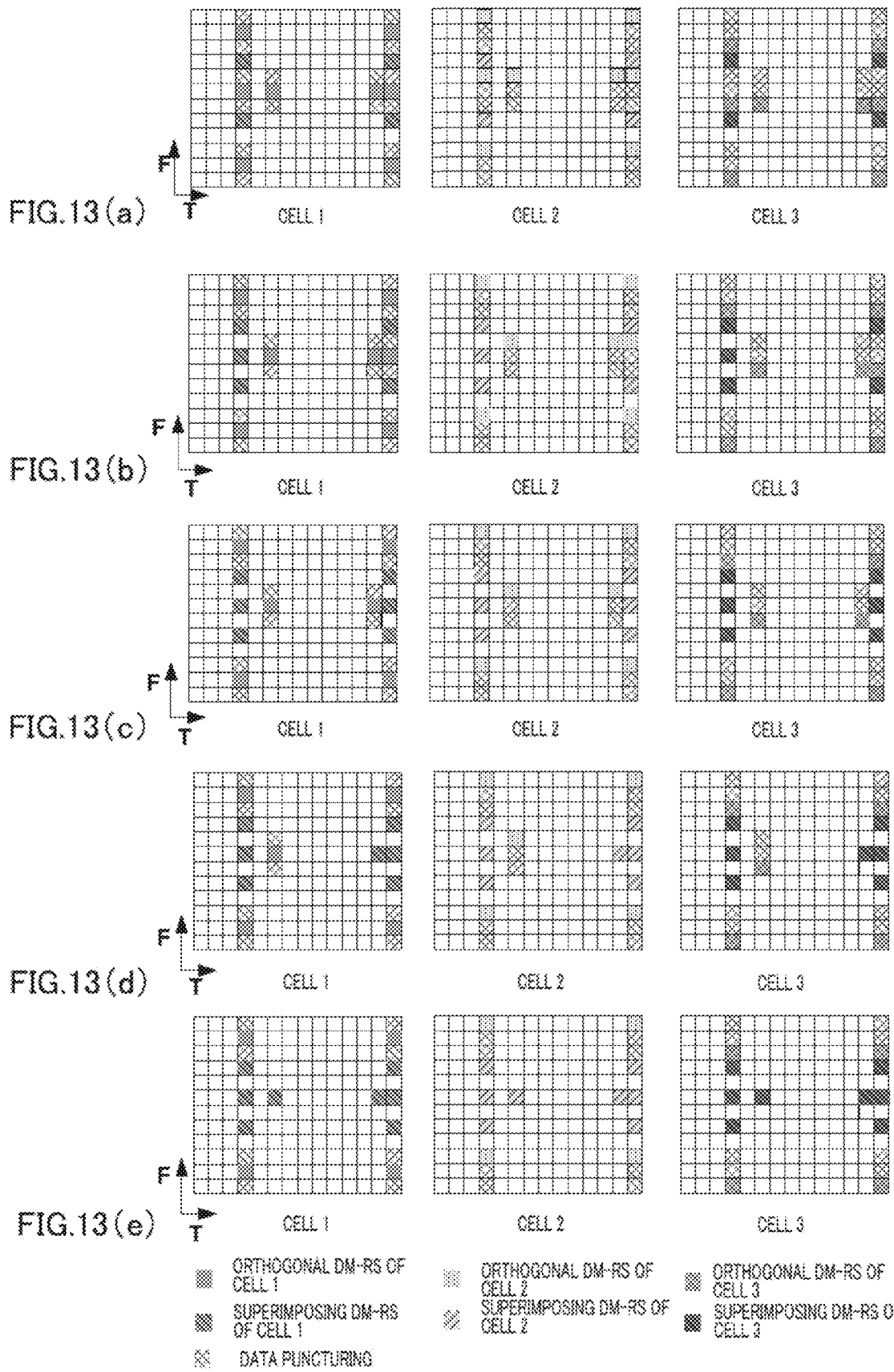
FIG. 13 is a diagram illustrating a situation in which DM-RSs are arranged in resource blocks of three neighboring cells using a DM-RS arrangement method according to Embodiment 5 of the present invention when there are four to eight superimposing DM-RSs in a resource block.

FIG. 12 is a flowchart of the DM-RS arrangement method according to Embodiment 4 of the present invention. In step S121, for resource blocks of respective cells, first orthogonal DM-RSs used for the data of the first layer are arranged at a high-frequency end of one edge OFDM symbol (hereinafter, abbreviated as "edge OFDM symbol 1") of the data region and second orthogonal DM-RSs used for the data of the first layer are arranged at a low-frequency end of the other edge OFDM symbol (hereinafter, abbreviated as "edge OFDM symbol 2"). Furthermore, at positions of the first and second orthogonal DM-RSs in edge OFDM symbols 1 and 2, a frequency offset exists between cells here. In step S 122, puncturing is performed at positions corresponding to the first and second orthogonal DM-RSs of the other cells in edge OFDM symbols 1 and 2 of the resource blocks of the respective cells. In step S123, regarding the resource blocks of the respective cells, the third orthogonal DM-RS used for the data of the second layer is arranged at a low-frequency end in edge OFDM symbol 1 and the fourth orthogonal DM-RS used for the data of the second layer is arranged at a high-frequency end of edge OFDM symbol 2. Here, a frequency offset exists between cells at positions of edge OFDM symbols 1 and 2 of the third and fourth orthogonal DM-RSs. In step S124, puncturing is performed at positions corresponding to the third and fourth orthogonal DM-RSs of the other cells in edge OFDM symbols 1 and 2 of the resource blocks of the respective cells. In step S125, superimposing DM-RSs used for the data of the first layer and data of the second layer are arranged in edge OFDM symbols 1 and 2 in a resource block of an arbitrary one cell and superimposing DM-RSs are arranged at positions in resource blocks of the other cells.

The essence of the DM-RS arrangement method according to the present embodiment is that in actual application, when it is difficult to guarantee that all orthogonal DM-RSs which are orthogonal to each other between cells are arranged in the four corners of the data region of each resource block for data of respective layers, orthogonal DM-RSs which are orthogonal to each other between cells are arranged on the diagonal of the data region of each resource block for data of respective layers, and it is thereby possible to solve the technical problems to be solved by the present invention.

The embodiment shown in FIG. 12 uses the resource block of each of the three cells to transmit two-layer data, which is however not essential. It can be easily thought of that the three cells can transmit one-layer data or two-layer data in their resource blocks as required. To be more specific, for example, resource blocks of one or two cells of the three cells are used to transmit two-layer data and DM-RSs are arranged according to the scheme shown in FIG. 12, and at the same time, resource blocks of the other two or one cell are used to transmit one-layer data and DM-RSs are arranged according to the scheme in FIG. 5.

(Embodiment 5)

In Embodiments 1 to 4 of the present invention, the quantity of superimposing DM-RSs in the respective resource blocks is fixed. In actual application, if the quantity of superimposing DM-RSs is variable according to a change in the channel or the load of the system, substantial flexibility can be brought about for system scheduling. Based on this concept, Embodiment 5 of the present invention will be presented.

A DM-RS arrangement method according to Embodiment 5 is basically the same as the DM-RS arrangement method according to Embodiment 1. In both embodiments, DM-RS signals are divided into orthogonal DM-RS signals and superimposing DM-RS signals, and orthogonality of orthogonal DM-RSs between cells is maintained through a frequency offset and puncturing at corresponding positions. Furthermore, orthogonal DM-RSs and superimposing DM-RSs are arranged in edge OFDM symbols of each resource block. Here, the superimposing DM-RS signals are located at the same positions of the resource block of each cell and the positions of the superimposing DM-RSs are sandwiched between the positions of the orthogonal DM-RSs in an edge OFDM symbol. Embodiment 5 is different from Embodiment 1 in that in Embodiment 1, all DM-RSs are arranged in edge OFDM symbols, while in Embodiment 5, two DM-RSs are shifted from an edge OFDM symbol to an available sub-edge OFDM symbol to thereby increase flexibility in DM-RS arrangement. FIG. 13(a) to FIG. 13(e) show situations in which DM-RSs are arranged in resource blocks of three neighboring cells using the DM-RS arrangement method of Embodiment 5 of the present invention when the number of superimposing DM-RSs in each resource block is 4, 5, 6, 7 and 8.

Actually, Embodiment 5 is an expanded version of Embodiment 1. For example, in Embodiment 1, two orthogonal DM-RSs and four superimposing DM-RSs are arranged in the respective edge OFDM symbols. However, this is nothing more than a kind of preferable illustrative implementation method, and it is actually possible to arrange two or more orthogonal DM-RSs in the respective edge OFDM symbols and adjust the quantity and arrangement positions of superimposing DM-RSs accordingly (shown in FIG. 13(a)). Similarly, it is also possible to reduce the quantity of superimposing DM-RSs in edge OFDM symbols and arrange superimposing DM-RSs in available sub-edge OFDM symbols (shown in FIG. 13(c)).

When a comparison is made among FIG. 13(a) to FIG. 13(e), it is observable that although the quantity of superimposing DM-RSs varies, DM-RSs are arranged in the resource block using a unified method. This is very advantageous in simplifying the design of a channel estimator. At the same time, it is observable from FIG. 13(a) to FIG. 13(e) that orthogonal DM-RSs are located in the four corners of the resource block, DM-RSs in the middle of the resource block are adjusted, and different quantities of superimposing DM-RSs are thereby realized.

The demodulation reference signal arrangement scheme of the present invention has been described using a plurality of embodiments so far. However, although the above-described embodiments have described the DM-RS arrangement method of the present invention in relation to a situation in which three neighboring cells exist, which is however nothing more than a kind of illustrative description and it can be easily thought of that the DM-RS arrangement method of the present invention is applicable to a situation with more than three neighboring cells.

Hereinafter, an apparatus that arranges demodulation reference signals in a radio communication system will be described.

Figure 14:
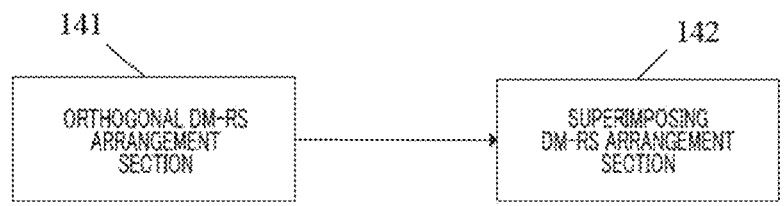
FIG. 14 is a configuration block diagram of an apparatus that arranges demodulation reference signals by applying the demodulation reference signal arrangement method according to Embodiment 1 of the present invention to a radio communication system.

FIG. 14 is a configuration block diagram of an apparatus that arranges demodulation reference signals by applying the demodulation reference signal arrangement method according to Embodiment 1 of the present invention to a radio communication system. Here, the plurality of cells in the radio communication system transmit different pieces of data to the receiving terminal using resource blocks having the same time/frequency resources. As shown in FIG. 14, the apparatus arranges at least two orthogonal DM-RSs in two edge OFDM symbols of a data region thereof for the resource blocks of the respective cells. Here, a frequency offset exists between the cells at positions of the orthogonal DM-RSs in the edge OFDM symbols. The apparatus includes orthogonal DM-RS arrangement section 141 that performs puncturing at positions corresponding to orthogonal DM-RSs of other cells in edge OFDM symbols and superimposing DM-RS arrangement section 142 that arranges superimposing DM-RSs in two edge OFDM symbols in a resource block of one of the cells in which orthogonal DM-RSs are arranged and also arranges superimposing DM-RSs at corresponding positions in resource blocks of the other cells. Here, the positions at which the above-described superimposing DM-RSs are arranged in the respective edge OFDM symbols are located between the positions at which the orthogonal DM-RSs are arranged.

Figure 15:
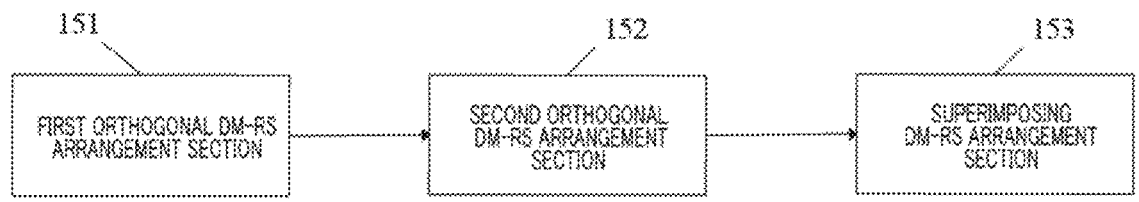
FIG. 15 is a configuration block diagram of an apparatus that arranges demodulation reference signals by applying the demodulation reference signal arrangement method according to Embodiment 4 of the present invention to a radio communication system.

FIG. 15 is a configuration block diagram of an apparatus that arranges demodulation reference signals by applying the demodulation reference signal arrangement method of Embodiment 4 of the present invention to a radio communication system. Here, a plurality of cells of the radio communication system transmit different pieces of data to a receiving terminal using resource blocks having the same time/frequency resources. Furthermore, two-layer data is transmitted in all of the respective data blocks. As shown in FIG. 15, the apparatus arranges a first orthogonal DM-RS used for data of the first layer at a high-frequency end of one edge OFDM symbol (hereinafter, abbreviated as "edge OFDM symbol 1") of a data region thereof and arranges a second orthogonal DM-RS used for the data of the first layer at a low-frequency end of one more edge OFDM symbol (hereinafter, abbreviated as "edge OFDM symbol 2") for resource blocks of the respective cells. Here, a frequency offset exists between the cells at positions of edge OFDM symbols of the above-described first and second orthogonal DM-RSs. The apparatus includes first orthogonal DM-RS arrangement section 151 that performs puncturing at positions corresponding to the first and second orthogonal DM-RSs of the other cell in edge OFDM symbols 1 and 2, a second orthogonal DM-RS arrangement section 152 that arranges a third orthogonal DM-RS used for the data of the second layer at a low-frequency end of edge OFDM symbol 1 for resource blocks of the respective cells in which the first and second orthogonal DM-RSs are arranged, arranges a fourth orthogonal DM-RS used for the data of the second layer at a high-frequency end of edge OFDM symbol 2 and performs puncturing at positions corresponding to the third and fourth orthogonal DM-RSs of the other cells in edge OFDM symbols 1 and 2 and superimposing DM-RS arrangement section 153 that arranges superimposing DM-RSs used for the data of the first layer and data of the second layer in edge OFDM symbols 1 and 2 in resource blocks of one of the cells in which orthogonal DM-RSs are arranged and also arranges superimposing DM-RSs at corresponding positions in resource blocks of the other cells. Here, a frequency offset exists between cells at positions in the edge OFDM symbols of the above-described third and fourth orthogonal DM-RSs.

A specific configuration of the demodulation reference signal arrangement apparatus according to the embodiments of the present invention is not intended to limit the scope of the present invention, but is nothing more than illustrative description, and some sections may be omitted, functions of some sections may be merged into one section and executed or functions of some sections may be divided into a plurality of smaller sections and executed.

Those skilled in the art may be able to understand the following. The present publication is not limited to the framework of conventional 3GPP LTE-A but can be applied under various different backgrounds, and the technological solving means of the present publication can be applied when, for example, the number of transmission layers is greater than 2 or when the number of reference signals on the respective resource blocks is equal to 12. Alternatively, orthogonal DM-RSs are located in the four corners of the data region of a resource block whenever possible, but superimposing DM-RSs may be located at positions between orthogonal DM-RSs on the time and frequency or need only to be located at intermediate positions of the data region and are not strictly be limited to locations on edge or sub-edge OFDM symbols. Alternatively, DM-RSs in the four corners are located apart from each other between cells on the frequency, but corresponding puncturing is not performed in neighboring cells and the estimation accuracy of DM-RSs in the four corners is improved using a method (power boosting) of improving transmission power of DM-RS in the four corners.

The respective embodiments in the present application are nothing more than descriptions as actual examples and specific configurations and operations of the respective embodiments do not limit the scope of the present invention and those skilled in the art can create a new implementation scheme by combining different parts and operations in the above-described embodiments, and this also likewise conforms to the thought of the present invention.

The embodiments of the present invention are implemented by hardware, software, firmware and a scheme combining them, but the implementation scheme does not limit the scope of the present invention.

Connection relationships between function elements (sections) in the embodiments of the present invention are not intended to limit the scope of the present invention and one or a plurality of elements thereof may include other arbitrary function elements or may be connected to other arbitrary function elements.

Some embodiments of the present invention have been presented and described by combining the attached drawings and it is self-evident to those skilled in the art that changes and modifications may be made to these embodiments without departing from the principles and spirit of the present inven-

The invention claimed is:

1. A method of arranging demodulation reference signals in a radio communication system that communicates according to a coordinated scheme, the demodulation reference signals and data being transmitted to a receiving terminal through time/frequency resources of the radio communication system using a resource block as a base unit, the method comprising:
   a step of arranging at least two orthogonal demodulation reference signals in two edge orthogonal frequency division multiplexing symbols located on one side of a time domain and the other side of the time domain respectively in data regions of resource blocks of respective cells, a frequency offset existing between cells at positions of the orthogonal demodulation reference signals in the edge orthogonal frequency division multiplexing symbols, and performing puncturing at positions corresponding to the orthogonal demodulation reference signals of the other cells in the edge orthogonal frequency division multiplexing symbols of the respective cells; and
   a step of arranging superimposing demodulation reference signals in the two edge orthogonal frequency division multiplexing symbols in a resource block of one cell and arranging the superimposing demodulation reference signals at positions corresponding to the resource blocks of the other cells, wherein:
   positions of the superimposing demodulation reference signals are set between the positions of the orthogonal demodulation reference signals in the respective edge orthogonal frequency division multiplexing symbols.

2. The method according to claim 1, wherein the step of arranging at least two orthogonal demodulation reference signals in two edge orthogonal frequency division multiplexing symbols for resource blocks of the respective cells comprises arranging the two orthogonal demodulation reference signals in the respective edge orthogonal frequency division multiplexing symbols for resource blocks of the respective cells, and arranging one of the two orthogonal demodulation reference signals at a high-frequency end of the edge orthogonal frequency division multiplexing symbol and arranging the other at a low-frequency end of the edge orthogonal frequency division multiplexing symbol.

3. The method according to claim 2, further comprising:
   a step of arranging two orthogonal demodulation reference signals in two available sub-edge orthogonal frequency division multiplexing symbols adjacent to the two edge orthogonal frequency division multiplexing symbols for the resource blocks of the respective cells, a frequency offset existing between cells at positions of the available sub-edge orthogonal frequency division multiplexing symbols of the orthogonal demodulation reference signals, and performing puncturing at positions corresponding to orthogonal demodulation reference signals in the available sub-edge orthogonal frequency division multiplexing symbols of the other cells in the available sub-edge orthogonal frequency division multiplexing symbols; and
   a step of arranging the superimposing demodulation reference signals in the two available sub-edge orthogonal frequency division multiplexing symbols in a resource block of one cell and arranging the superimposing demodulation reference signals at positions corresponding to the resource blocks of the other cells, wherein:
   the position of the superimposing demodulation reference signal is set between the positions of the orthogonal demodulation reference signals in the respective available sub-edge orthogonal frequency division multiplexing symbols.

4. The method according to claim 3, wherein one-layer data is transmitted in the resource blocks of respective cells.

5. The method according to claim 3, wherein:
   two-layer data is transmitted in the resource block of at least one cell,
   the orthogonal demodulation reference signals and the superimposing demodulation reference signals in the edge orthogonal frequency division multiplexing symbol located on one side of the time domain, and the orthogonal demodulation reference signals and the superimposing demodulation reference signals in the available sub-edge orthogonal frequency division multiplexing symbol adjacent to the edge orthogonal frequency division multiplexing symbol located on the other side of the time domain are demodulation reference signals used for data of a first layer, and
   the orthogonal demodulation reference signals and the superimposing demodulation reference signals in the edge orthogonal frequency division multiplexing symbol located on the other side of the time domain, and the orthogonal demodulation reference signals and the superimposing demodulation reference signals in the available sub-edge orthogonal frequency division multiplexing symbol adjacent to the edge orthogonal frequency division multiplexing symbol located on the one side of the time domain are demodulation reference signals used for data of a second layer.

6. The method according to claim 3, wherein two-layer data is transmitted in the resource block of at least one cell and the orthogonal demodulation reference signals and superimposing demodulation reference signals are arranged for the data of the first layer and the data of the second layer respectively.

7. The method according to claim 6, wherein:
   the orthogonal demodulation reference signals and the superimposing demodulation reference signals used for the data of the first layer, and the orthogonal demodulation reference signals and the superimposing demodulation reference signals used for the data of the second layer are superimposed at the same positions in the resource block, and
   orthogonality is maintained between the data of the first layer and the data of the second layer in the orthogonal demodulation reference signals and the superimposing demodulation reference signals using a code division multiplexing scheme.

8. The method according to claim 1, wherein:
   a number of the orthogonal demodulation reference signals and the superimposing demodulation reference signals arranged in the resource blocks of respective cells is 12 and the number of the orthogonal demodulation reference signals and the superimposing demodulation reference signals arranged in the respective edge orthogonal frequency division multiplexing symbols is 5,
   the method further comprises a step of arranging one of the orthogonal demodulation reference signals or one of the superimposing demodulation reference signals in two available sub-edge orthogonal frequency division multiplexing symbols adjacent to the two edge orthogonal frequency division multiplexing symbols respectively for resource blocks of the respective cells, and the one orthogonal demodulation reference signal maintains orthogonality between cells and the one superimposing demodulation reference signal is located at the same position in the resource block of each cell.

9. The method according to claim 8, wherein the number of the superimposing demodulation reference signals arranged in the resource blocks of respective cells is 4, 5, 6, 7 or 8.

10. A method of arranging demodulation reference signals in a radio communication system that communicates according to a coordinated scheme, the demodulation reference signals and data being transmitted to a receiving terminal through time/frequency resources of the radio communication system using a resource block as a base unit, the method comprising:

a step of arranging a first orthogonal demodulation reference signal at a high-frequency end of one edge orthogonal frequency division multiplexing symbol of data regions of resource blocks of respective cells, arranging a second orthogonal demodulation reference signal at a low-frequency end of the other edge orthogonal frequency division multiplexing symbol, a frequency offset existing between cells at positions of the first orthogonal demodulation reference signal and the second orthogonal demodulation reference signal in the edge orthogonal frequency division multiplexing symbol, and performing puncturing at positions corresponding to the first orthogonal demodulation reference signal and the second orthogonal demodulation reference signal of the other cells in the edge orthogonal frequency division multiplexing symbol;

a step of arranging a third orthogonal demodulation reference signal at a low-frequency end of the one edge orthogonal frequency division multiplexing symbol for resource blocks of the respective cells, arranging a fourth orthogonal demodulation reference signal at a high-frequency end of the other edge orthogonal frequency division multiplexing symbol, a frequency offset existing between cells at positions of the edge orthogonal frequency division multiplexing symbols of the third orthogonal demodulation reference signal and the fourth orthogonal demodulation reference signal, and performing puncturing at positions in the other cells corresponding to the third orthogonal demodulation reference signal and the fourth orthogonal demodulation reference signal in the edge orthogonal frequency division multiplexing symbol; and a step of arranging superimposing demodulation reference signals in the one edge orthogonal frequency division multiplexing symbol and the other edge orthogonal frequency division multiplexing symbol of the resource block of one cell and arranging the superimposing demodulation reference signals at the corresponding positions of the resource blocks of the other cells.

11. The method according to claim 10, wherein one-layer data is transmitted in the resource blocks of respective cells.

12. The method according to claim 10, wherein:
two-layer data is transmitted in the resource block of at least one cell,
the first orthogonal demodulation reference signal and the second orthogonal demodulation reference signal are demodulation reference signals used for data of the first layer, and
the third orthogonal demodulation reference signal and the fourth orthogonal demodulation reference signal are demodulation reference signals used for data of the second layer.

13. An apparatus that arranges demodulation reference signals in a radio communication system that communicates according to a coordinated scheme, the demodulation reference signals and data being transmitted to a receiving terminal through time/frequency resources of the radio communication system using a resource block as a base unit, the apparatus comprising:

an orthogonal demodulation reference signal arrangement section that arranges at least two orthogonal demodulation reference signals in two edge orthogonal frequency division multiplexing symbols of a data region for resource blocks of the respective cells, a frequency offset existing between cells at positions of the orthogonal demodulation reference signals in the edge orthogonal frequency division multiplexing symbols, and performs puncturing at positions corresponding to the orthogonal demodulation reference signals of the other cells in the edge orthogonal frequency division multiplexing symbols; and a superimposing demodulation reference signal arrangement section that arranges superimposing demodulation reference signals in the two edge orthogonal frequency division multiplexing symbols in a resource block of one cell in which the orthogonal demodulation reference signals are arranged and arranges the superimposing demodulation reference signals at corresponding positions in the resource blocks of the other cells, wherein:

the position of the superimposing demodulation reference signal is set between the positions of the orthogonal demodulation reference signals in the respective edge orthogonal frequency division multiplexing symbols.

14. An apparatus that arranges demodulation reference signals in a radio communication system that communicates according to a coordinated scheme, the demodulation reference signals and data being transmitted to a receiving terminal through time/frequency resources of the radio communication system using a resource block as a base unit, the apparatus comprising:

a first orthogonal demodulation reference signal arrangement section that arranges a first orthogonal demodulation reference signal at a high-frequency end in one edge orthogonal frequency division multiplexing symbol of data regions in resource blocks of respective cells, arranges a second orthogonal demodulation reference signal at a low-frequency end of the other edge orthogonal frequency division multiplexing symbol, a frequency offset existing between cells at positions of the first orthogonal demodulation reference signal and the second orthogonal demodulation reference signal in the edge orthogonal frequency division multiplexing symbol and performs puncturing at positions corresponding to the first orthogonal demodulation reference signal and the second orthogonal demodulation reference signal of the other cells in the edge orthogonal frequency division multiplexing symbol;

a second orthogonal demodulation reference signal arrangement section that arranges a third orthogonal demodulation reference signal at a low-frequency end of the one edge orthogonal frequency division multiplexing symbol and a fourth orthogonal demodulation reference signal at a high-frequency end of the other edge orthogonal frequency division multiplexing symbol in resource blocks of respective cells in which the first orthogonal demodulation reference signal and the second orthogonal demodulation reference signal are arranged, a frequency offset existing between cells at positions of the third orthogonal demodulation reference signal and the fourth orthogonal demodulation reference signal in the edge orthogonal frequency division multiplexing symbols, and performs puncturing at positions corresponding to the third orthogonal demodulation reference signal and the fourth orthogonal demodulation reference signal of the other cells in the edge orthogonal frequency division multiplexing symbols; and a superimposing demodulation reference signal arrangement section that arranges superimposing demodulation reference signals in the one edge orthogonal frequency division multiplexing symbol and the other edge orthogonal frequency division multiplexing symbol in a resource block of one cell in which the orthogonal demodulation reference signals are arranged and arranges the superimposing demodulation reference signals at corresponding positions in the resource blocks of the other cells.

* * * * *